(12) United States Patent
Foltin

(10) Patent No.: US 10,029,606 B2
(45) Date of Patent: Jul. 24, 2018

(54) METHOD AND CONTROL UNIT FOR SETTING A CHARACTERISTIC OF A LIGHT EMISSION OF AT LEAST ONE HEADLIGHT OF A VEHICLE

(71) Applicant: Robert Bosch GmbH, Stuttgart (DE)

(72) Inventor: Johannes Ludwig Foltin, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 301 days.

(21) Appl. No.: 14/964,211

(22) Filed: Dec. 9, 2015

(65) Prior Publication Data
US 2016/0193956 A1    Jul. 7, 2016

(30) Foreign Application Priority Data

Dec. 11, 2014   (DE) .................. 10 2014 225 526

(51) Int. Cl.
   *B60Q 1/14*       (2006.01)
(52) U.S. Cl.
   CPC .......... *B60Q 1/1423* (2013.01); *B60Q 1/143* (2013.01); *B60Q 2300/052* (2013.01); *B60Q 2300/32* (2013.01); *B60Q 2300/41* (2013.01); *B60Q 2300/42* (2013.01); *B60Q 2300/45* (2013.01)
(58) Field of Classification Search
   CPC .......... B60Q 1/1423; B60Q 1/143; B60Q 2300/052; B60Q 2300/32; B60Q 2300/41; B60Q 2300/42; B60Q 2300/45; F21S 48/17

USPC ........................................... 701/49
See application file for complete search history.

(56) References Cited

U.S. PATENT DOCUMENTS

| 5,499,168 | A  | * | 3/1996  | Cochard ............. | B60Q 1/0011 180/169 |
| 5,562,336 | A  | * | 10/1996 | Gotou .................. | B60Q 1/085 362/276 |
| 7,824,086 | B2 | * | 11/2010 | Yamamura .......... | F21S 48/1159 362/509 |
| 8,157,427 | B2 | * | 4/2012  | Mochizuki ........... | B60Q 1/143 315/82 |
| 8,729,803 | B2 | * | 5/2014  | Yamazaki ............ | B60Q 1/143 315/77 |
| 8,738,236 | B2 | * | 5/2014  | Moizard ............... | B60Q 1/12 362/466 |
| 8,862,336 | B2 | * | 10/2014 | Dierks ................. | B60Q 1/143 362/466 |
| 9,227,553 | B2 | * | 1/2016  | Nordbruch .......... | B60Q 1/085 |

(Continued)

*Primary Examiner* — Tyler J Lee
(74) *Attorney, Agent, or Firm* — Norton Rose Fulbright US LLP; Gerard Messina

(57) ABSTRACT

A method for setting a characteristic of a light emission of at least one headlight of a vehicle, in which the method includes reading in concealment data which represent at least one property of at least one concealment object situated adjacent to a roadway in surroundings of the vehicle. In addition, the method includes ascertaining a distance between the vehicle and a segment of the roadway situated in the forward travel direction of the vehicle, adjacent to the at least one concealment object, using the concealment data. Moreover, the method includes adapting a waiting time period and/or waiting distance for changing the characteristic of the light emission from a first characteristic to a second characteristic as a function of the ascertained distance.

8 Claims, 3 Drawing Sheets

(56) References Cited

U.S. PATENT DOCUMENTS

| | | | | |
|---|---|---|---|---|
| 9,481,292 B2* | 11/2016 | Faber | ............... | B60Q 1/085 |
| 2001/0012206 A1* | 8/2001 | Hayami | ............ | B60Q 1/085 |
| | | | | 362/464 |
| 2004/0143380 A1* | 7/2004 | Stam | ............... | B60Q 1/085 |
| | | | | 701/36 |
| 2004/0201483 A1* | 10/2004 | Stam | ............... | B60Q 1/1423 |
| | | | | 340/600 |
| 2007/0025112 A1* | 2/2007 | Kuhl | ............... | B60Q 1/10 |
| | | | | 362/466 |
| 2008/0175012 A1* | 7/2008 | Shimaoka | ......... | B60Q 1/085 |
| | | | | 362/464 |
| 2008/0239746 A1* | 10/2008 | Wuller | ............. | B60Q 1/085 |
| | | | | 362/538 |
| 2009/0018711 A1* | 1/2009 | Ueda | ............... | G08G 1/165 |
| | | | | 701/1 |
| 2011/0012510 A1* | 1/2011 | Tani | ............... | B60Q 1/1423 |
| | | | | 315/82 |
| 2011/0068910 A1* | 3/2011 | Iwai | ............... | B60Q 1/085 |
| | | | | 340/435 |
| 2014/0015411 A1* | 1/2014 | Ehlgen | ............ | B60Q 1/143 |
| | | | | 315/82 |
| 2014/0207307 A1* | 7/2014 | Jonsson | ........... | B60W 50/14 |
| | | | | 701/1 |
| 2015/0028742 A1* | 1/2015 | Imaeda | ............ | B60Q 1/143 |
| | | | | 315/82 |
| 2017/0225611 A1* | 8/2017 | Kim | ............... | B60Q 1/1423 |

* cited by examiner

METHOD AND CONTROL UNIT FOR SETTING A CHARACTERISTIC OF A LIGHT EMISSION OF AT LEAST ONE HEADLIGHT OF A VEHICLE

RELATED APPLICATION INFORMATION

The present application claims priority to and the benefit of German patent application no. 10 2014 225 526.0, which was filed in Germany on Dec. 11, 2014, the disclosure of which is incorporated herein by reference.

FIELD OF THE INVENTION

The present invention relates to a method for setting a characteristic of a light emission of at least one headlight of a vehicle, a corresponding control unit, and a corresponding computer program.

BACKGROUND INFORMATION

High beam assistance systems may adapt a light distribution to an environmental situation. A customary high beam assist (HBA) may automatically switch over between low-beam light and high-beam light, and adaptive systems may dynamically adapt the light distribution to a traffic situation. Adaptive systems include, for example, assistance systems such as adaptive high beam control (AHC), adaptive cut-off line (aCOL), or adaptive light-dark cutoff, which, similar to headlight leveling control, may raise a light-dark cutoff of a headlight just high enough so that other road users are not blinded. Continuous high beam control (CHC), or vertical cut-off line (vCOL), may generate a light distribution which is similar to high-beam light, whereby a shared shadow corridor is generatable around road users or groups of road users in order to shield them in a targeted manner. The so-called "matrix beam" or the so-called "pixel light" may generate independent shadow corridors for multiple road users. In addition, it is possible, based on information concerning the surroundings, to switch on specific static light distributions such as city light, expressway light, or rural roadway light.

SUMMARY OF THE INVENTION

Against this background, with the approach provided here, a method for setting a characteristic of a light emission of at least one headlight of a vehicle, a control unit which uses this method, and lastly, a corresponding computer program, according to the main claims are provided. Advantageous embodiments result from the respective subclaims and the following description.

According to specific embodiments of the present invention, in particular a debouncing time or debouncing distance for a change in illumination from vehicle headlights may be adapted to a roadside concealment or vegetation on the roadside. The debouncing time may be adapted in such a way that, for example, when entering or approaching an area with concealment objects on the roadside, a waiting time until turning up the headlights is shortened. In other words, the debouncing time or debouncing distance may be shortened, for example prior to passing through an area with vegetation, so that, for example, the headlights are turned up or controller parameters are adapted prior to entering a forest area so that more light strikes the roadway area prior to entry. In particular concealment data, for example a "lateral concealment signal," or a vegetation signal may be utilized for this purpose in order to ascertain such a situation of increased visibility requirements, for example a dark forest with the risk of animal crossings. If, for example, dense vegetation is present directly ahead of the vehicle and/or a lateral distance from at least one concealment object is small, the debouncing time or debouncing distance, in particular a waiting time or waiting distance, for turning up the headlights may be shortened, or a controller may be designed to be more dynamic in order to more quickly set a high-beam light or a light distribution which is similar to high-beam light.

According to specific embodiments of the present invention, in the case of approaching a concealment segment of the roadway or an area with at least one concealment object in a border area of a roadway, the visibility for a vehicle driver in the concealment segment may advantageously be increased or improved. Thus, in particular a vegetation signal or the like may advantageously be utilized, also independently of a visual range estimation or determination, in order to improve a situation of approaching forests or other concealment segments for vehicle drivers with regard to visibility.

In particular, a higher quality light distribution or light emission in the sense of similarity to high beam may be achieved more quickly. A "lateral concealment signal" or a vegetation signal may thus be utilized for shifting a configuration of a high beam assist from a comfort optimization toward a visual range optimization in order to achieve an advantageous balance between an optimization for a small number of changes in the light emission, or a calm system response, and an optimization to the visual range. This means that the waiting time for turning up the headlights, or the dynamics of an adaptive headlight system, may be adapted to concealment data in order to shorten the waiting time or achieve a quicker system response, in particular prior to a concealment segment or area with vegetation, and additionally or alternatively if the vegetation situation becomes worse, for example also a reduction in a lateral distance from concealment objects relative to a roadway. A prioritized optimization to a small number of changes in the light distributions or a calm system response may be dispensed with under the circumstance of adapting to a visual range, for example when, prior to entering a forest area, which results in a small visual range or a reduction in the visual range, assuming a constant light emission, a driver requires a high beam light distribution more quickly, for example in order to recognize animals on and near the roadway, or the like, in a timely manner.

In particular an enhancement of a setting strategy or an operating mode for the light emission with regard to concealment objects and their distance relative to the vehicle may be achieved with little complexity. Thus, setting of the light emission in a visibility-optimized mode and also with regard to sufficient comfort may take place, whereby in particular an operation to turn up the headlights may be shortened or speeded up prior to an area with at least one concealment object next to the roadway.

A method for setting a characteristic of a light emission of at least one headlight of a vehicle is provided, the method including the following steps:

reading in concealment data which represent at least one property of at least one concealment object situated adjacent to a roadway in a surroundings of the vehicle;

ascertaining a distance between the vehicle and a segment of the roadway situated in the forward travel direction of the vehicle, adjacent to the at least one concealment object, using the concealment data; and adapting a waiting time period and/or waiting distance for changing the characteristic of the light emission from a first characteristic to a second characteristic as a function of the ascertained distance.

The vehicle may be a road-bound vehicle, in particular a motor vehicle such as a passenger vehicle, a truck, a motorcycle, a commercial vehicle, or the like. The vehicle may be situated on a roadway or street. The characteristic of the light emission may represent a light distribution, a light intensity distribution, or the like. When the characteristic of the light emission is changed, the light emission may be modified discretely, quasi-continuously, or continuously. The first characteristic may have a lower light emission than the second characteristic. The first characteristic may be a low-beam light characteristic or a characteristic which is similar to low-beam light. The second characteristic may be a high-beam light characteristic or a characteristic which is similar to high-beam light. The first characteristic may be an output characteristic or instantaneously emitted characteristic, and the second characteristic may be a target characteristic of the light emission which is to be achieved by the change. The at least one concealment object may be a vegetation object, in particular a bush, a tree, or the like. A plurality of concealment objects may represent a forest or a wooded area, for example.

The at least one concealment object may be situated in a border area or along the roadway on which the vehicle is situated. In particular, the at least one concealment object may be situated in the forward travel direction of the vehicle in front of, and additionally or alternatively to the side, relative to the vehicle or the roadway. In the case of a plurality of concealment objects, at least one first concealment object may be situated on a first side of the roadway, and at least one second concealment object may be situated on one of the two sides of the roadway. The segment of the roadway situated in the forward travel direction of the vehicle, adjacent to the at least one concealment object, may be referred to as a concealment segment. The concealment segment may represent a surface area on the roadway, a partial segment of the roadway, or a point on the roadway. The distance may be additionally ascertained in the step of ascertaining, using position data of the vehicle.

The waiting time period, and additionally or alternatively a controller time constant, may be adapted in the step of adapting. A waiting parameter, which may represent a waiting time period, and additionally or alternatively a waiting distance, may thus be adapted in the step of adapting. A waiting time period may thus also be understood to mean a waiting distance when, instead of a time dependency of the switchover between two characteristics, a distance is utilized for a switchover point. When the speed is constant, the waiting distance may correspond to a speed-dependent waiting time period. Using a waiting time period based on a distance covered, i.e., a waiting distance, may advantageously be utilized for stationary objects, for example trees or other stationary concealment objects. Thus, in the following discussion the waiting time period and the waiting distance may be used synonymously or may be understood to be synonymous, or may be replaced by the general term "waiting parameter."

According to one specific embodiment, the waiting time period may be set to a first waiting time period in the step of adapting when the ascertained distance is greater than a first threshold value. The waiting time period may be set to a second waiting time period when the ascertained distance is less than the first threshold value. The second waiting time period may be shorter than the first waiting time period. Such a specific embodiment offers the advantage that when a concealment segment is approached, the headlights may be reliably turned up or a light emission may be increased, as a function of distance, in a timely manner in such a way that visibility into the concealment segment may be improved.

According to one specific embodiment, a value of the second waiting time period may be set as a function of a value of the ascertained distance. The smaller the distance which is ascertained and which falls below the first threshold value, the shorter the second waiting time period may thus be set.

In addition, the waiting time period may be set to the second waiting time period in the step of adapting when the ascertained distance is between the first threshold value and a second threshold value which is less than the first threshold value. The waiting time period may also be set to a third waiting time period when the ascertained distance is less than the second threshold value, the third waiting time period being shorter than the second waiting time period or equal to the second waiting time period. Such a specific embodiment offers the advantage that the distance-dependent increase of the light emission may take place in a stepped manner, so that below a minimum distance from the at least one concealment object, represented by the second threshold value, a minimum waiting time period may be implemented.

The first threshold value, and additionally or alternatively the second threshold value, may be determined, for example computed or set, as a function of the at least one property of the at least one concealment object. The at least one property may represent a distance of the at least one concealment object relative to the roadway, and additionally or alternatively, an optical density of the at least one concealment object. The distance of the at least one concealment object relative to the roadway may represent the shortest lateral distance from the roadway or from a roadside.

Such a specific embodiment offers the advantage that a particularly accurate setting of the light emission which is coordinated with an actual concealment situation may be achieved when threshold values for the waiting time adaptation are definable variably or as a function of concealment properties.

According to one specific embodiment, the distance between the vehicle and the segment of the roadway situated in the forward travel direction of the vehicle, adjacent to the at least one concealment object, may be ascertained in the step of ascertaining when the at least one concealment object is situated closer than a lateral limiting distance from the roadway. The lateral limiting distance may represent a distance below which the vehicle driver visibility into the concealment segment may be increased by changing the characteristic of the light emission. Such a specific embodiment offers the advantage that the setting of the light emission, in the sense of turning up the headlights prior to concealment segments, may be carried out particularly reliably and according to the situation, whereby unnecessarily turning up the headlights without a noticeable increase in visibility may be avoided, but the headlights may be turned up quickly in the case of concealment objects, situated close to the roadway, which reduce the visual range.

In the step of ascertaining, a first distance between the vehicle and a first segment of the roadway situated in the forward travel direction of the vehicle may also be ascertained, relative to which the at least one concealment object is situated closer than a first lateral limiting distance. In addition, a second distance between the vehicle and a second segment of the roadway situated in the forward travel direction of the vehicle may be ascertained, relative to which the at least one concealment object is situated closer than a second lateral limiting distance, which is greater than the first lateral limiting distance. The first distance may be compared to the second threshold value in the step of setting, and the second distance may be compared to the first threshold value. Such a specific embodiment offers the advantage that different lateral distances of concealment objects relative to the roadway may be taken into account in order to meaningfully adapt the light emission according to the situation.

The method may include a step of determining the concealment data. The concealment data may be determined using surroundings data which represent at least one property of the surroundings of the vehicle. A position, a pattern, an optical density, and additionally or alternatively, a distance of the at least one concealment object relative to a roadway, relative to the vehicle, and additionally or alternatively, relative to a trajectory of the vehicle, may be determined as the at least one property of the at least one concealment object in the step of determining. The surroundings data may be receivable from a unit external to the vehicle, and additionally or alternatively, from a unit internal to the vehicle. The surroundings data may include geodata, navigation data, building development data, vegetation data, image data, and additionally or alternatively, distance data of the at least one concealment object relative to the roadway, relative to the vehicle, and additionally or alternatively, relative to a trajectory of the vehicle. Navigation data may include vegetation information which is evaluatable with regard to concealment objects.

In addition, image data recorded with the aid of a stereo camera, for example, may be evaluatable, whereby concealment objects, in particular also concealment objects on the side of the roadway, for example bushes, houses, parked vehicles, and the like, may be recognized. Such a specific embodiment offers the advantage that the light emission from vehicle headlights may be set particularly accurately and reliably using the concealment data determined in this way.

The approach provided here also provides a control unit which is designed for carrying out, controlling, or implementing the steps of one variant of a method provided here in appropriate units. The underlying object of the present invention may also be quickly and efficiently achieved by this embodiment variant of the present invention.

In the present context, a control unit may be understood to mean an electrical device which processes sensor signals and outputs control and/or data signals as a function thereof. The control unit may include an interface which may have a hardware and/or software design. In a hardware design, the interfaces may be part of a so-called system ASIC, for example, which contains various functions of the control unit. However, it is also possible for the interfaces to be dedicated, integrated circuits, or to be at least partially made up of discrete components. In a software design, the interfaces may be software modules which are present on a microcontroller, for example, in addition to other software modules.

Also advantageous is a computer program product or a computer program having program code which may be stored on a machine-readable carrier or memory medium such as a semiconductor memory, a hard disk memory, or an optical memory, and used for carrying out, implementing, and/or controlling the steps of the method according to one of the specific embodiments described above, in particular when the program product or program is executed on a computer or a device.

An advantageous approach may thus be found for the mutually dependent objectives of visual range, blinding, and comfort. Rapid changes between light distributions may distract the driver, for which reason a delay in a switchover may be implemented. In adaptive systems, this could mean low pass filtering of an output signal or a slow controller design, for example. A high beam assist may be designed to delay turning up the headlights when temporarily concealed road users would result in immediate headlight dimming when they appear after the headlights have been turned up, and additionally or alternatively, to delay headlight dimming and set a minimum high-beam light duration. For acceptance and favorable assessment of a high beam assist by customers, not only smooth dynamics, for example avoiding discomfort from so-called flicker or erratic changes, but also the visual range, for example avoiding discomfort from insufficient stimulation or a too small minimum visual range, play a role.

The visual range is essential for driving a vehicle, and likewise has an influence on the feeling of comfort or discomfort by the driver. The term "blinding" may refer to blinding of other road users. Blinding of the driver of the host vehicle may have different forms and components: As the result of so-called veiling luminance, physiological blinding may reduce a contrast of a perceived image, and thus, an actual recognizability distance or visual range. Psychological blinding may cause an unpleasant feeling in blinded persons, but has no effect on visual function, which is addressed by physiological blinding. Physiological blinding ("disability glare") may have an effect on the visual function. Physiological blinding and psychological blinding ("discomfort glare") may occur together, for example.

High beam assists may utilize information concerning the surroundings, for example continuous roadway illumination such as in a city or a structural separation on an expressway, as well as an existing traffic situation, for example preceding vehicles, oncoming vehicles, etc., in order to adapt a system response. For example, during travel past a single oncoming vehicle, the headlights may be turned back up more quickly in order to rapidly provide a driver with better visibility or a larger visual range due to a better light distribution, for example high-beam light instead of low-beam light. If a preceding vehicle suddenly disappears, the waiting time may be longer than for a vehicle traveling past, since the former vehicle could be temporarily concealed. Due to an extended waiting time, temporary turning up of the headlights may be prevented, since the other vehicle could immediately become visible again, for example during continued travel along a curve. A long waiting time may be set on roadways having a structural separation, since headlights of other vehicles may be infrequently visible, for example, and therefore longer time periods may be present between detection times.

Due to a long waiting time, frequent switching over between low-beam light and high-beam light may be prevented and comfort may be increased, and blinding of other drivers, in particular truck drivers sitting in an elevated position, may be avoided. Temporary turning up of the headlights, which would result in a flickering sensation, may be avoided. Temporary turning up of the headlights may be recognized by a vehicle camera system, so that a minimum low-beam light duration may be set in order to calm a controller response of a high beam assist and increase comfort. In adaptive systems, which may generate quasi-continuous light distributions, a short waiting time may generally correspond to a small controller time constant, and thus, a rapid, dynamic response, and a longer waiting time may generally correspond to a large controller time constant, and thus, a slow, calm response.

The approach provided here is explained in greater detail below by way of example, with reference to the appended drawings.

DETAILED DESCRIPTION

Figure 1:
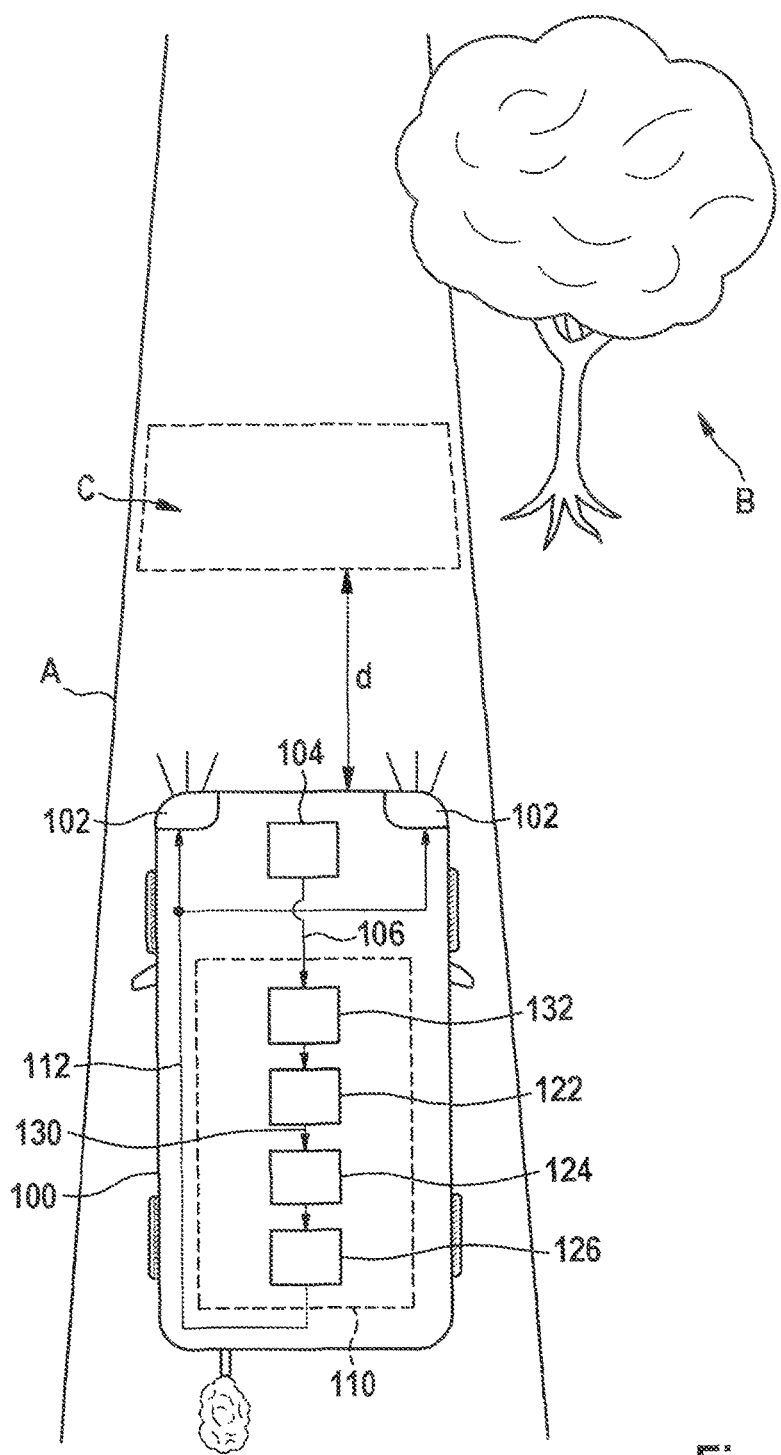
FIGS. 1, 2, 3 and 4 show schematic illustrations of a vehicle which includes a control unit according to one exemplary embodiment of the present invention, in surroundings situations.

In the following description of advantageous exemplary embodiments of the present invention, identical or similar reference numerals are used for the elements having a similar action which are illustrated in the various figures, and a repeated description of these elements is dispensed with.

For the purpose of simplification and readability, exemplary embodiments are sometimes described in particular with regard to classical high beam assists, use also being provided for adaptive systems, resulting in a change in system dynamics. In adaptive systems, a short waiting time period corresponds to a rapid system response, as the result of which, for example, a target light distribution or target characteristic is achieved more quickly, and a long waiting time period corresponds to a slower, more sluggish system response, as the result of which a target light distribution or target characteristic is achieved later or more slowly.

FIG. 1 shows a schematic illustration of a vehicle 100 which includes a control unit according to one exemplary embodiment of the present invention, in a surroundings or a surroundings situation. Vehicle 100 is a motor vehicle in the form of a passenger vehicle. Vehicle 100 is situated on a street or roadway A. By way of example, a concealment object B in the form of a tree is situated in a border area of roadway A or next to roadway A in the forward travel direction ahead of vehicle 100. The surroundings of vehicle 100 thus include roadway A and concealment object B. A concealment segment C of roadway A is situated adjacent to concealment object B. In other words, roadway A includes concealment segment C, adjacent to which concealment object B is situated. Vehicle 100 is situated at a distance d from concealment segment C.

Vehicle 100 shown in FIG. 1 includes two headlights 102. Headlights 102 are front headlights. Headlights 102 are controllable in order to generate a light emission. In the process, a characteristic of the light emission is changeable. For example, headlights 102 are controllable in order to generate a light emission which is changeable between a first characteristic and a second characteristic. The first characteristic is, for example, a low-beam light characteristic and the second characteristic is, for example, a high-beam light characteristic. According to the exemplary embodiment of the present invention illustrated in FIG. 1, the first characteristic represents an actual state, for example.

Vehicle 100 also has a surroundings data detection unit 104. Surroundings data detection unit 104 is designed for detecting surroundings data 106 which represent at least one property of the surroundings of the vehicle. For example, surroundings data detection unit 104 is designed as a position detection unit, a vehicle camera, a data transmission unit, a surroundings detection unit, e.g., a surroundings sensor, or a travel data detection unit. Optionally, vehicle 100 may include a plurality of surroundings data detection units 104 which may have different designs. Surroundings data detection unit 104 is designed for providing surroundings data 106, in particular via an interface, for example a cable or a wireless data link. Surroundings data 106 are, for example, geodata, navigation data, building development data, vegetation data, image data, and additionally or alternatively, distance data of concealment object B or of concealment segment C relative to roadway A, relative to vehicle 100, and additionally or alternatively, relative to a trajectory of vehicle 100 on roadway A.

In addition, vehicle 100 includes the control unit, which is referred to below as a setting device 110. Setting device 110 or the control unit is designed for setting a characteristic of a light emission of headlights 102 of vehicle 100. Setting device 110 according to the exemplary embodiment of the present invention illustrated in FIG. 1 is designed for receiving and reading in surroundings data 106. In addition, setting device 110 is designed for outputting or providing a control signal 112 for controlling headlights 102. In particular, setting device 110 is designed for generating control signal 112, using surroundings data 106 or concealment data determined from surroundings data 106. Setting device 110 is designed for outputting control signal 112 to headlights 102 or to a control device, not illustrated in FIG. 1, for controlling headlights 102.

Setting device 110 or the control unit includes a reader unit 122, an ascertainment unit 124, and an adaptation unit 126. Reader unit 122 is designed for reading in concealment data 130, which represent at least one property of concealment object B situated adjacent to roadway A in the surroundings of vehicle 100. Concealment data 130 are determined or generated using surroundings data 106. In addition, reader unit 122 is designed for relaying concealment data 130 to ascertainment unit 124. Ascertainment unit 124 is designed for ascertaining distance d between the vehicle and the at least one concealment object B or concealment segment C, using concealment data 130. In addition, ascertainment unit 124 is designed for relaying a piece of information which represents ascertained distance d to adaptation unit 126. Adaptation unit 126 is designed for adapting or modifying, as a function of ascertained distance d, a waiting time period for changing the characteristic of the light emission from a first characteristic to a second characteristic. According to the exemplary embodiment illustrated in FIG. 1, the first characteristic of the light emission represents a low-beam light characteristic, and the second characteristic of the light emission represents a high-beam light characteristic. The waiting time period represents a waiting time or a debouncing time for turning up the headlights or switching over from a low-beam light characteristic to a high-beam light characteristic. The characteristic of the light emission is thus changeable as a function of the adapted waiting time period. Adaptation unit 126 is designed for generating control signal 112 or for providing the adapted waiting time period of a unit, not shown, for generating control signal 112, using the adapted waiting time period.

According to one exemplary embodiment, adaptation unit 126 is designed for setting a first waiting time period when ascertained distance d is greater than a first threshold value, and for setting a second waiting time period when ascertained distance d is less than the first threshold value. The second waiting time period is shorter than the first waiting time period. Adaptation unit 126 is optionally designed for setting the second waiting time period as a function of distance d, variably or as a function of distance d. In addition, according to one exemplary embodiment, adaptation unit 126 is designed for setting the above-mentioned second waiting time period when ascertained distance d is between the first threshold value and a second threshold value, which is less than the first threshold value.

Adaptation unit 126 is also designed for setting a third waiting time period, which is less than or equal to the second waiting time period, for the case that ascertained distance d is less than the second threshold value. In other words, adaptation unit 126 is designed in such a way that the smaller the ascertained distance d is, the shorter the waiting time period becomes. Setting device 110 or the control unit, or in particular adaptation unit 126, is optionally designed for computing or setting the first threshold value, and additionally or alternatively the second threshold value, as a function of the at least one property of concealment object B. The at least one property is in particular a distance or lateral distance of concealment object B relative to roadway A, an optical density of concealment object A, and additionally or alternatively, some other property which influences visibility.

Setting device 110 or the control unit optionally also includes a determination unit 132. Determination unit 132 is designed for receiving surroundings data 106 from surroundings data detection unit 104. Determination unit 132 is designed for determining concealment data 130, using surroundings data 106. In addition, determination unit 132 is designed for relaying determined concealment data 130 to reader unit 122.

Figure 2:
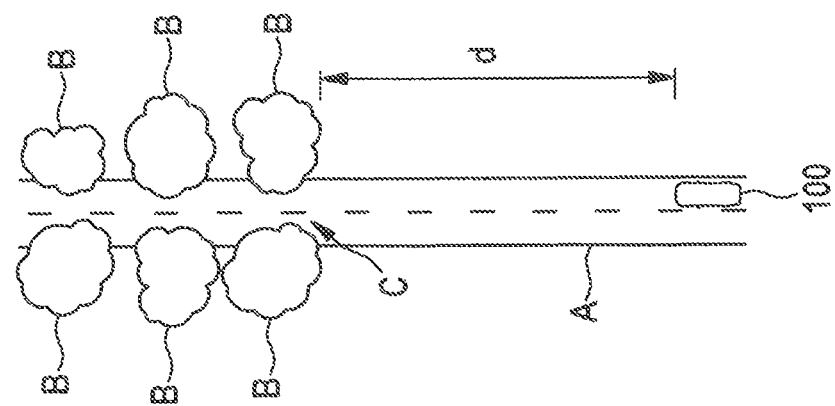

FIG. 2 shows a schematic illustration of vehicle 100 together with the control unit from FIG. 1 in a different surroundings situation. Vehicle 100 is situated on roadway A. Concealment segment C, in which a plurality of concealment objects B is situated in a border area of roadway A or on the side of the roadway, is situated at distance d in the forward travel direction ahead of vehicle 100. Multiple concealment objects B in the form of trees or bushes are situated in an area of concealment segment C on both sides of roadway A.

In other words, FIG. 2 shows vehicle 100 which is equipped with the control unit from FIG. 1. Vehicle 100 is situated at distance d from concealment segment C, which is situated in a wooded area. The concealment data describe lateral concealment by concealment objects B in an area bordering roadway A, which extends along or in parallel to a trajectory of vehicle 100 on roadway A. The concealment data concerning the wooded area are ascertainable or generatable from surroundings data, for example a vegetation signal, indirectly via navigation information, for example, and other surroundings sensors. Vehicle 100 is operating with low-beam light, or a characteristic of the light emission is set which corresponds to low-beam light, due to the fact that, for example, another vehicle has been passed immediately beforehand.

Figure 3:
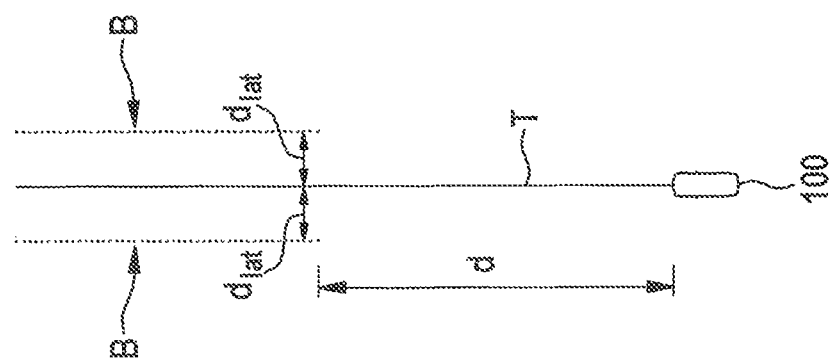

FIG. 3 shows a schematic illustration of vehicle 100 together with the control unit from FIG. 1 in the surroundings situation from FIG. 2, represented in a different way. Thus, instead of the roadway, a trajectory T of vehicle 100 is depicted in FIG. 3. Trajectory T corresponds to a route of vehicle 100 on the roadway. In addition, concealment objects B situated at distance d from vehicle 100 are merely implied, and symbolize a representation of a vegetation signal. In addition, a lateral distance $d_{lat}$ of concealment objects B from trajectory T of vehicle 100 is depicted in FIG. 3. Solely as an example, concealment objects B on both sides of trajectory T have the same lateral distance $d_{lat}$ relative to trajectory T. In other words, FIG. 3 shows vehicle 100 during entry into a wooded area.

Concealment objects B in the form of trees or vegetation thus have lateral distance $d_{lat}$ with respect to the roadway or trajectory T. The control unit or the setting device of vehicle 100 is designed for recognizing that vehicle 100 is in an "approaching vegetation" state when distance d is less than the first threshold value or an upper threshold value. In this state, the control unit or the setting device of vehicle 100 is designed for adapting the waiting time period for turning up the headlights as a function of distance d. It is thus possible, for example, to provide a smooth transition from comfort-oriented driving into a visual range-optimized mode. If distance d is less than the second threshold value or a lower threshold value, a change is made into a "directly prior to vegetation" state with the aid of the control unit. In this state, the control unit is designed for setting the waiting time period in such a way that the headlights may be turned up immediately if possible, for example if no other vehicle is visible.

According to one exemplary embodiment, the threshold values may be definable as a function of lateral distance $d_{lat}$ from the vegetation or concealment objects B. The ascertainment unit of the control unit is designed for ascertaining distance d between vehicle 100 and a concealment segment of the roadway situated in the forward travel direction of vehicle 100, in which concealment objects B also have a lateral distance $d_{lat}$ relative to the roadway or trajectory T which is less than a lateral limiting distance. The control unit or the setting device of vehicle 100 is thus designed for setting the "directly prior to vegetation" state when lateral distance $d_{lat}$ is less than a first limiting distance, and for setting the "approaching vegetation" state when lateral distance $d_{lat}$ is less than a second limiting distance. By utilizing limit distances and threshold values, a high beam assist is optimized to improve visibility, in particular in dense vegetation. In a clear situation without concealment objects B, or with concealment objects B with large lateral distances, driver comfort or a smooth response may be optimized. The first limiting distance is less than the second limiting distance. As a result, for example a system response of a high beam assist is optimized solely toward visibility when necessary, for example when a narrow passage area between concealment objects B is present. According to another exemplary embodiment, the control unit is designed for adapting the waiting time period, and additionally or alternatively the threshold values, as a function of a density of the vegetation or of concealment objects B. This is because in less dense vegetation, the driver generally does not have the same high requirements for visibility as in dense vegetation.

Figure 4:
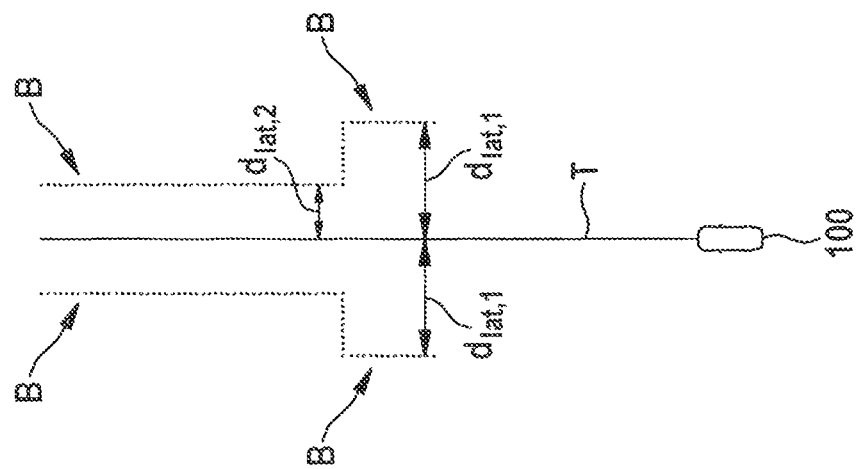

FIG. 4 shows a schematic illustration of vehicle 100 together with the control unit from FIG. 1 in another surroundings situation. The illustration, i.e., the surroundings situation, shown in FIG. 4 corresponds to that from FIG. 3, with the exception that in FIG. 4, concealment objects B have different lateral distances $d_{lat,1}$ and $d_{lat,2}$ relative to trajectory T. A lateral distance of concealment objects B along trajectory T changes from a first lateral distance $d_{lat,1}$ at a close range from vehicle 100 to a second lateral distance $d_{lat,2}$ at a distant range from vehicle 100. First lateral distance $d_{lat,1}$ is greater than second lateral distance $d_{lat,2}$ of concealment objects B relative to trajectory T. The lateral distance of concealment objects B relative to trajectory T changes, by way of example, in a step on both sides of trajectory T, whereby the lateral distance may alternatively change gradually or continuously.

In other words, FIG. 4 shows a situation in which the lateral distance of the vegetation or concealment objects B changes. According to one exemplary embodiment, in a case in which first lateral distance $d_{lat,1}$ is greater than the threshold values, mentioned above with reference to FIG. 1, for changing into a state, and second lateral distance $d_{lat,2}$ is less than one of the limit distances mentioned above with reference to FIG. 3, the control unit or the setting device of vehicle 100 is designed for ascertaining distance d from vehicle 100 to a reference point for the distance measurement at which second lateral distance $d_{lat,2}$ begins, viewed from vehicle 100. This means that an actual start of the concealment segment or the lateral vegetation is not significant, and the point at which the lateral distance falls below a limiting distance is taken into account for ascertaining distance d.

It is possible for the ascertainment of a distance d for the "approaching vegetation" state to be carried out relative to a reference point at which first lateral distance $d_{lat,1}$ is present, and for the ascertainment of another distance d for the "directly prior to vegetation" state to be carried out relative to a reference point at which second lateral distance $d_{lat,2}$ is present. This is a function of the respective lateral distances. In other words, the ascertainment unit of the control unit may thus be designed for ascertaining a first distance d between vehicle 100 and a first segment or reference point of the roadway or of trajectory T situated in the forward travel direction of the vehicle, relative to which concealment objects B are situated closer than the first lateral limiting distance. In addition, the ascertainment unit of the control unit may be designed for ascertaining a second distance d between vehicle 100 and a second segment or reference point of the roadway or of trajectory T situated in the forward travel direction of the vehicle, relative to which concealment objects B are situated closer than the second lateral limiting distance, which is greater than the first lateral limiting distance.

According to one exemplary embodiment, in which vehicle 100 is already situated, for example, in an area with close and dense vegetation as concealment objects B and a change within a certain distance or an abrupt change in the lateral distance of concealment objects B occurs, the ascertainment unit of the control unit may be designed for using a position of the abrupt change in the lateral distance as a reference point for ascertaining distance d, and for effectuating a state similar to the "directly prior to vegetation" state when the distance falls below one of the threshold values from vehicle 100 to this position, as the result of which, for example, the headlights may be immediately turned up.

It is further noted that, due to a system response of the control unit to a driver of vehicle 100 in areas with vegetation or lateral concealment, a wide view may be quickly provided. The control unit is optionally designed for carrying out a setting, mentioned above, of the light emission, even with vegetation on one side of roadway A or close vegetation on one side. Adaptation unit 126 is designed for adapting the waiting time period with the aid of a limited or fixed factor.

According to one exemplary embodiment and with reference to FIGS. 1 through 4, a left lateral distance and a right lateral distance, viewed with reference to the roadway, may differ from one another. This may be the case in particular for streets with oncoming traffic. Such different lateral distances may be offset against one another and/or compared in order to obtain a shared lateral distance $d_{lat}$ for a further computation. Depending on the design, for example an average value of the left and right lateral distances may be used as lateral distance $d_{lat}$, or, for example, the smaller or larger of the two lateral distances may be used as lateral distance $d_{lat}$. Depending on the design, a left lateral distance and a right lateral distance, viewed with respect to the roadway, may be considered or processed separately from one another. A more accurate adaptation of a system response to a particular surroundings situation may thus be made possible.

Figure 5:
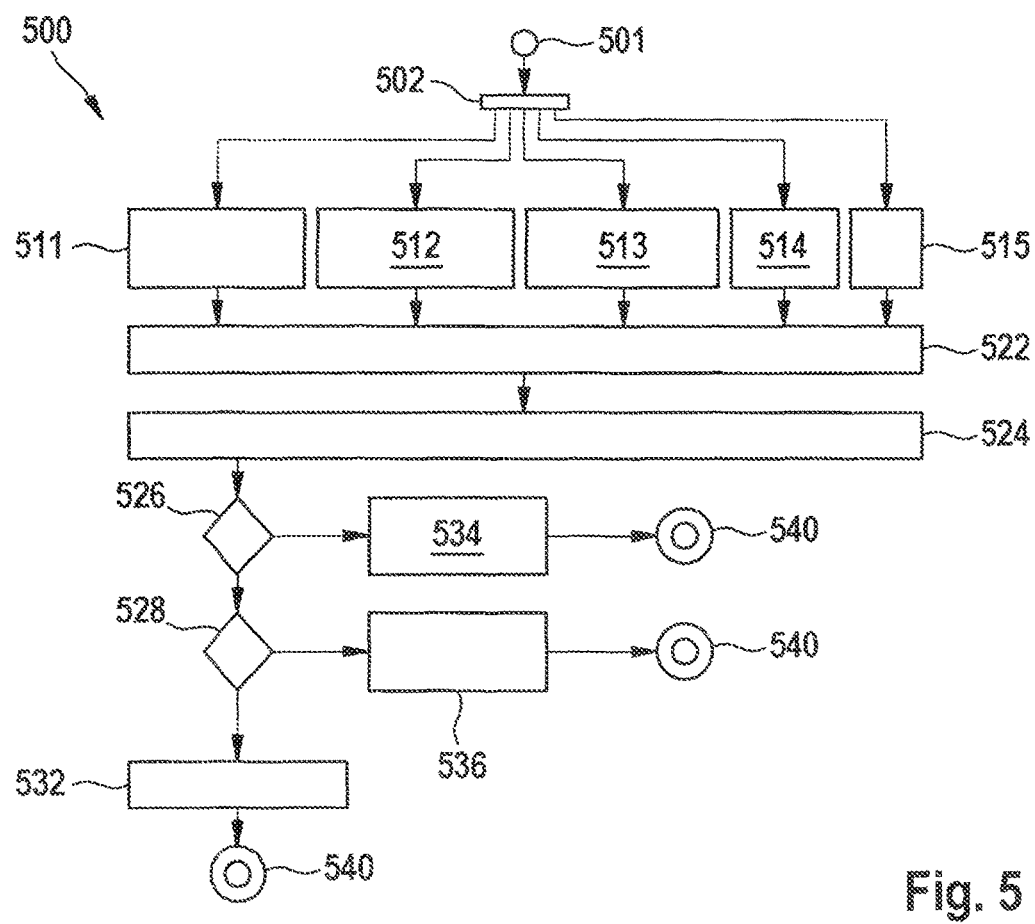
FIG. 5 shows a flow chart of a process according to one exemplary embodiment of the present invention.

FIG. 5 shows a flow chart of a process 500 according to one exemplary embodiment of the present invention. Process 500 is a process for setting a light emission of at least one headlight of a vehicle. Process 500 may be carried out in conjunction with a vehicle or a control unit from one of FIGS. 1 through 4 in order to advantageously set the light emission of at least one headlight of the vehicle.

From a starting point 501, process 500 arrives at a branch point 502. From branch block 502, process 500 branches, solely as an example, into five blocks 511, 512, 513, 514, and 515, connected in parallel, in which surroundings data are received. Navigation data are received in block 511, ultrasound data are received in block 512, depth information is ascertained in block 513, a vehicle trajectory is ascertained in block 514, and block 515 represents further data sources for surroundings data. From each of blocks 511, 512, 513, 514, and 515, process 500 arrives at a block 522 in which the presence and geometry of lateral concealments are ascertained. In process 500, block 522 is followed by a block 524 in which a distance d from dense vegetation or the like is ascertained.

After block 524, process 500 crosses over to a first decision block 526 in which a threshold value decision is made as to whether ascertained distance d is less than a lower threshold value. If this is not the case, after first decision block 526, process 500 then arrives at a second decision block 528 in which a further threshold value decision is made as to whether ascertained distance d is less than an upper threshold value. If this is not the case, after second decision block 528, process 500 crosses over to a block 532 in which a waiting time period for changing the light emission is maintained unmodified or unchanged, and thus, for example, a standard response of a high beam assist is set or remains. After block 532, process 500 arrives at an end block 540.

If it is determined in first decision block 526 that ascertained distance d is less than the lower threshold value, after first decision block 526, process 500 crosses over to a block 534 in which the waiting time period for changing the light emission is shortened in such a way that turning up the headlights is possible immediately, a so-called response being set directly prior to vegetation. After block 534, process 500 likewise arrives at an end block 540. If it is determined in second decision block 528 that ascertained distance d is less than the upper threshold value, after second decision block 528, process 500 crosses over to a block 536 in which the waiting time period for changing the light emission is shortened in such a way that a setpoint waiting time is adapted as a function of ascertained distance d, a so-called "approaching vegetation" response being set. Also after block 536, process 500 arrives at an end block 540. After each of end blocks 540, process 500 terminates, or process 500 may be carried out anew or again.

Figure 6:
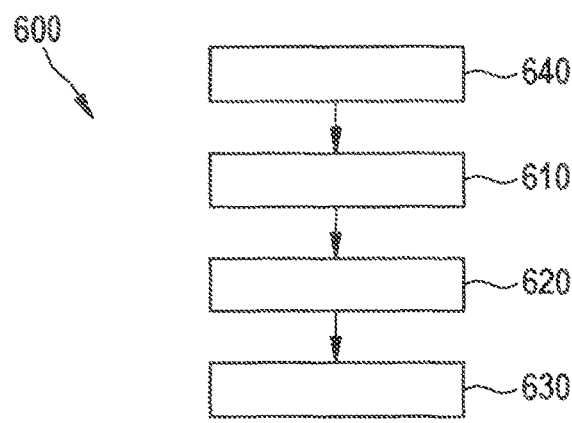
FIG. 6 shows a flow chart of a method according to one exemplary embodiment of the present invention.

FIG. 6 shows a flow chart of a method 600 according to one exemplary embodiment of the present invention. Method 600 is a method for setting a light emission of at least one headlight of a vehicle. Method 600 may be carried out in conjunction with a vehicle or a control unit from one of FIGS. 1 through 4 in order to advantageously set the light emission of at least one headlight of the vehicle. In addition, method 600 is similar to the process described for FIG. 5, and may be carried out in conjunction with same.

Method 600 includes a step 610 of reading in concealment data which represent at least one property of at least one concealment object situated adjacent to a roadway in a surroundings of the vehicle. In method 600, a value of a distance between the vehicle and a segment of the roadway situated in the forward travel direction of the vehicle, adjacent to the at least one concealment object, is ascertained in a subsequent step 620 of ascertaining, using the read-in concealment data. A value of a waiting time period for changing the characteristic of the light emission from a first characteristic to a second characteristic as a function of the ascertained distance is adapted in a step 630 of adapting. Thus, by carrying out method 600, the light emission is settable as a function of the ascertained distance, and additionally or alternatively, as a function of at least one further property of the at least one concealment object.

According to one exemplary embodiment, prior to step 610 of reading in, method 600 includes a step 640 of determining the concealment data. The concealment data, which represent at least one property of the surroundings of the vehicle, are determined in step 640 of determining, using surroundings data.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment. Furthermore, the method steps provided here may be repeated, and carried out in a sequence different from that described.

If an exemplary embodiment includes an "and/or" linkage between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for setting a characteristic of a light emission of at least one headlight of a vehicle, the method comprising:
   reading in concealment data which represent at least one property of at least one concealment object situated adjacent to a roadway in a surroundings of the vehicle;
   ascertaining a distance between the vehicle and a segment of the roadway situated in the forward travel direction of the vehicle, adjacent to the at least one concealment object, using the concealment data; and
   adapting a waiting time period and/or waiting distance for changing the characteristic of the light emission from a first characteristic to a second characteristic as a function of the ascertained distance, wherein the waiting time period and/or waiting distance is set to a first waiting time period and/or waiting distance in the adapting when the ascertained distance is greater than a first threshold value, and the waiting time period and/or waiting distance is set to a second waiting time period and/or waiting distance when the ascertained distance is less than the first threshold value, the second waiting time period and/or waiting distance being shorter than the first waiting time period and/or waiting distance.

2. The method of claim 1, wherein a value of the second waiting time period and/or waiting distance is set as a function of a value of the ascertained distance in the adapting.

3. The method of claim 1, wherein the waiting time period and/or waiting distance is set to the second waiting time period and/or waiting distance in the adapting when the ascertained distance is between the first threshold value and a second threshold value which is less than the first threshold value, and the waiting time period and/or waiting distance is set to a third waiting time period and/or waiting distance when the ascertained distance is less than the second threshold value, the third waiting time period and/or waiting distance being shorter than the second waiting time period and/or waiting distance or equal to the second waiting time period and/or waiting distance.

4. The method of claim 1, wherein the first threshold value and/or the second threshold value is determined as a function of the at least one property of the at least one concealment object, the at least one property representing a distance of the at least one concealment object relative to the roadway, and/or an optical density of the at least one concealment object.

5. The method of claim 1, wherein the distance between the vehicle and the segment of the roadway is ascertained in the ascertaining when the at least one concealment object is situated closer than a lateral limiting distance from the roadway.

6. The method of claim 1, further comprising:
   determining the concealment data, using surroundings data which represent at least one property of the surroundings of the vehicle.

7. A control unit for setting a characteristic of a light emission of at least one headlight of a vehicle, comprising:
   a control arrangement unit configured to perform the following:
      reading in, from a surroundings sensor, concealment data which represent at least one property of at least one concealment object situated adjacent to a roadway in a surroundings of the vehicle;
      ascertaining a distance between the vehicle and a segment of the roadway situated in the forward travel direction of the vehicle, adjacent to the at least one concealment object, using the concealment data; and
      adapting a waiting time period and/or waiting distance for changing the characteristic of the light emission from a first characteristic to a second characteristic as a function of the ascertained distance, wherein the waiting time period and/or waiting distance is set to a first waiting time period and/or waiting distance in the adapting when the ascertained distance is greater than a first threshold value, and the waiting time period and/or waiting distance is set to a second waiting time period and/or waiting distance when the ascertained distance is less than the first threshold value, the second waiting time period and/or waiting distance being shorter than the first waiting time period and/or waiting distance.

8. A non-transitory computer readable medium having a computer program, which is executable by a processor, comprising:

a program code arrangement having program code for setting a characteristic of a light emission of at least one headlight of a vehicle, by performing the following:

reading in concealment data which represent at least one property of at least one concealment object situated adjacent to a roadway in a surroundings of the vehicle;

ascertaining a distance between the vehicle and a segment of the roadway situated in the forward travel direction of the vehicle, adjacent to the at least one concealment object, using the concealment data; and adapting a waiting time period and/or waiting distance for changing the characteristic of the light emission from a first characteristic to a second characteristic as a function of the ascertained distance, wherein the waiting time period and/or waiting distance is set to a first waiting time period and/or waiting distance in the adapting when the ascertained distance is greater than a first threshold value, and the waiting time period and/or waiting distance is set to a second waiting time period and/or waiting distance when the ascertained distance is less than the first threshold value, the second waiting time period and/or waiting distance being shorter than the first waiting time period and/or waiting distance.

* * * * *